US012639098B2

(12) United States Patent
Ruiz et al.

(10) Patent No.: US 12,639,098 B2
(45) Date of Patent: May 26, 2026

(54) SHARING ACCESS TO A PHYSICAL DEVICE WITH MULTIPLE VIRTUAL MACHINES

(71) Applicant: RED HAT, INC., Raleigh, NC (US)

(72) Inventors: Alberto Carlos Ruiz, Madrid (ES);
Francisco Javier Martinez Canillas,
Barcelona (ES); Sergio Lopez Pascual,
Saragossa (ES)

(73) Assignee: Red Hat, Inc., Raleigh, NC (US)

( * ) Notice: Subject to any disclaimer, the term of this
patent is extended or adjusted under 35
U.S.C. 154(b) by 419 days.

(21) Appl. No.: 18/486,767

(22) Filed: Oct. 13, 2023

(65) Prior Publication Data

US 2025/0123868 A1     Apr. 17, 2025

(51) Int. Cl.
*G06F 9/455* (2018.01)

(52) U.S. Cl.
CPC .................... *G06F 9/45558* (2013.01); *G06F
2009/45579* (2013.01); *G06F 2009/45591*
(2013.01)

(58) Field of Classification Search
None
See application file for complete search history.

(56) References Cited

U.S. PATENT DOCUMENTS

| | | | | |
|---|---|---|---|---|
| 7,743,389 B2 * | 6/2010 | Mahalingam | ....... | G06F 9/45558 |
| | | | | 719/321 |
| 9,069,591 B1 * | 6/2015 | Beloussov | ............ | G06F 9/5077 |
| 10,754,676 B2 * | 8/2020 | Alvarez | .............. | G06F 9/45558 |
| 2005/0198632 A1 * | 9/2005 | Lantz | .................. | G06F 9/45558 |
| | | | | 718/1 |
| 2017/0364428 A1 * | 12/2017 | Ganesan | ............. | G06F 11/2069 |
| 2022/0066811 A1 * | 3/2022 | Zhao | ......................... | G06F 9/46 |

* cited by examiner

*Primary Examiner* — Shin-Hon (Eric) Chen
(74) *Attorney, Agent, or Firm* — Kilpatrick Townsend &
Stockton LLP

(57) ABSTRACT

Access to a physical device associated with a computing
system can be shared with multiple virtual machines by
delegating control of the physical device to a primary virtual
machine (PVM). In some aspects, a virtual machine monitor
(VMM) of the computing system can generate a hardware
description that describes the physical device. The VMM
can initiate the PVM, which can use the hardware descrip-
tion to acquire control of the physical device from a host
kernel of the computing system. The VMM can delegate
control of the physical device from the host kernel to the
PVM. After control of the physical device is delegated to the
PVM, the PVM is configured to perform a device sharing
process to share access to the physical device with the SVM.

15 Claims, 6 Drawing Sheets

300

302
Generate, by a virtual machine monitor (VMM), a hardware description to describe a physical device 304
Initiate, by the VMM, a primary virtual machine (PVM), the PVM configured to use the hardware description to acquire control of the physical device from a host kernel 306
Delegate, by the VMM, control of the physical device from the host kernel to the PVM, the PVM configured to perform a device sharing process to share access to the physical device with a secondary virtual machine (SVM)

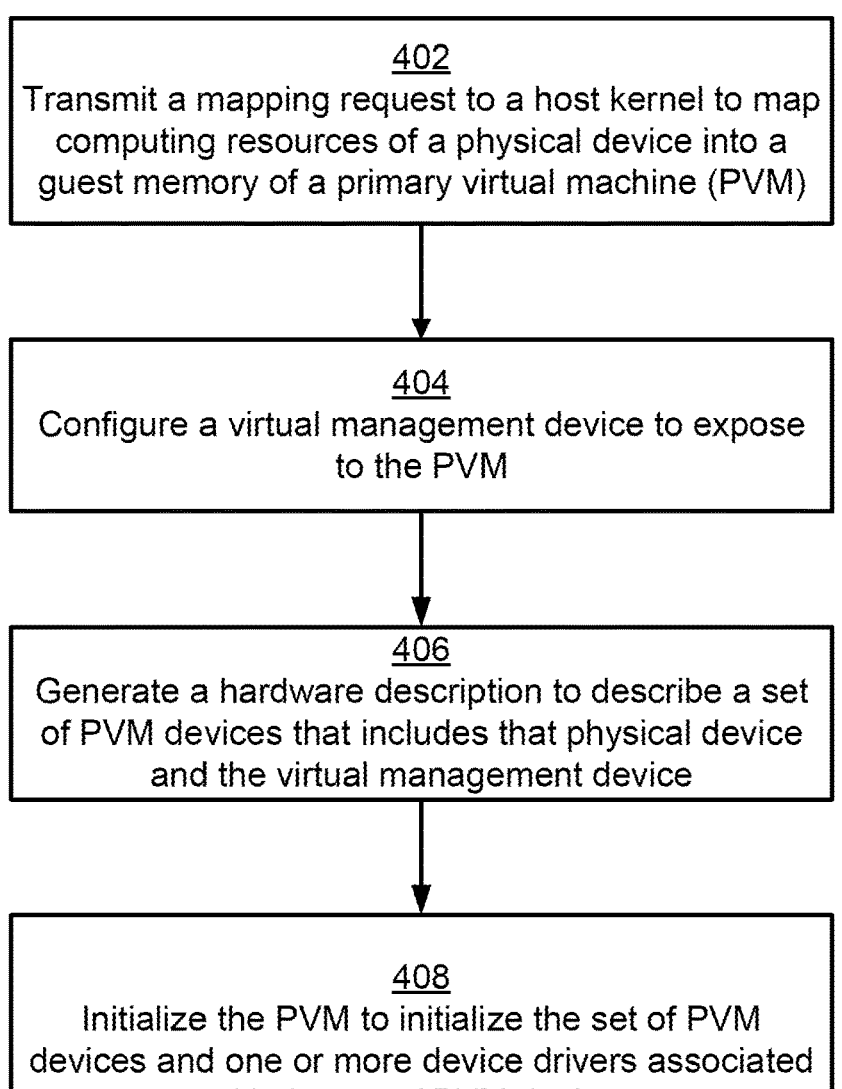

402
Transmit a mapping request to a host kernel to map computing resources of a physical device into a guest memory of a primary virtual machine (PVM)

404
Configure a virtual management device to expose to the PVM

406
Generate a hardware description to describe a set of PVM devices that includes that physical device and the virtual management device

408
Initialize the PVM to initialize the set of PVM devices and one or more device drivers associated with the set of PVM devices

502
Transmit, by a virtual machine monitor (VMM) to a primary virtual machine (PVM), an access request for a secondary virtual machine (SVM) to access a physical device 504
Allocate, by the VMM, a shared memory region of a guest memory of the PVM to enable the SVM to access the physical device 506
Map, by the PVM, a user space of the PVM to the shared memory region 508
Expose, by the PVM, a PVM service to the SVM to enable the SVM to access the physical device

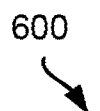

602
Initialize, by a secondary virtual machine (SVM), a virtual device to access a physical device, the virtual device functioning as a virtualization of the physical device

604
Create, by the virtual device, a buffer object associated with a dataset, the dataset being shared by the SVM with a primary virtual machine (PVM)

606
Transmit, by the virtual device, a reference to the buffer object to the PVM, the reference to the buffer object being used to map the dataset to a guest memory of the PVM

*FIG. 6*

SHARING ACCESS TO A PHYSICAL DEVICE WITH MULTIPLE VIRTUAL MACHINES

TECHNICAL FIELD

The present disclosure relates generally to virtual machines. More specifically, but not by way of limitation, this disclosure relates to sharing access to a physical device with multiple virtual machines.

BACKGROUND

Virtual machines are one popular mechanism for deploying virtual computing environments on a physical computer system. A virtual machine (VM) typically includes virtualized hardware and guest software. The virtualized hardware can emulate physical computer hardware. Examples of the virtualized hardware can include virtual central processing units (vCPUs), virtual random access memory (vRAM), virtual network interfaces, and virtual storage. The guest software can be any software programs that execute on top of the virtual machine. Examples of the guest software can include a guest operating system, a guest supervisory program, and one or more guest applications that may execute in user space. Guest software is generally given limited access to the physical resources of the underlying host machine.

Virtual machines can be deployed on a host machine using a hypervisor. A hypervisor can be a software layer that sits below the virtual machines and above the physical hardware of the host machine. In some cases, the hypervisor can execute on top of an operating system running on the host machine. In other cases, the hypervisor can execute directly on the physical hardware without an operating system beneath it. Either way, the hypervisor can provide interfaces between the virtual machines and the underlying physical hardware of the host machine.

The hypervisor (or another virtual machine manager (VMM)) can manage processor resources allocated to guest virtual machines. The VMM may virtualize the physical layer and provide interfaces between the underlying hardware and guest virtual machines and any guest operating systems. The VMM can use these interfaces to manage resources given to applications running on a guest virtual machine.

Virtualization may be used to provide some physical components as logical objects in order to allow running various software modules, concurrently and in isolation from other software modules, on a computing device or a collection of connected computing devices. Virtualization may allow, for example, for consolidating multiple physical servers into one physical server running multiple guest virtual machines in order to improve the hardware utilization rate.

BRIEF DESCRIPTION OF THE DRAWINGS

FIG. 3 is a flowchart of a process for sharing access to a physical device with multiple virtual machines according to some aspects of the present disclosure.

FIG. 4 is a flowchart of a process for delegating control of a physical device to a primary virtual machine (PVM) according to some aspects of the present disclosure.

FIG. 5 is a flowchart of a process for sharing access to a physical device with a secondary virtual machine (SVM) via a PVM according to some aspects of the present disclosure.

FIG. 6 is a flowchart of a process for sharing a dataset between a PVM and an SVM according to some aspects of the present disclosure.

DETAILED DESCRIPTION

Figure 1:
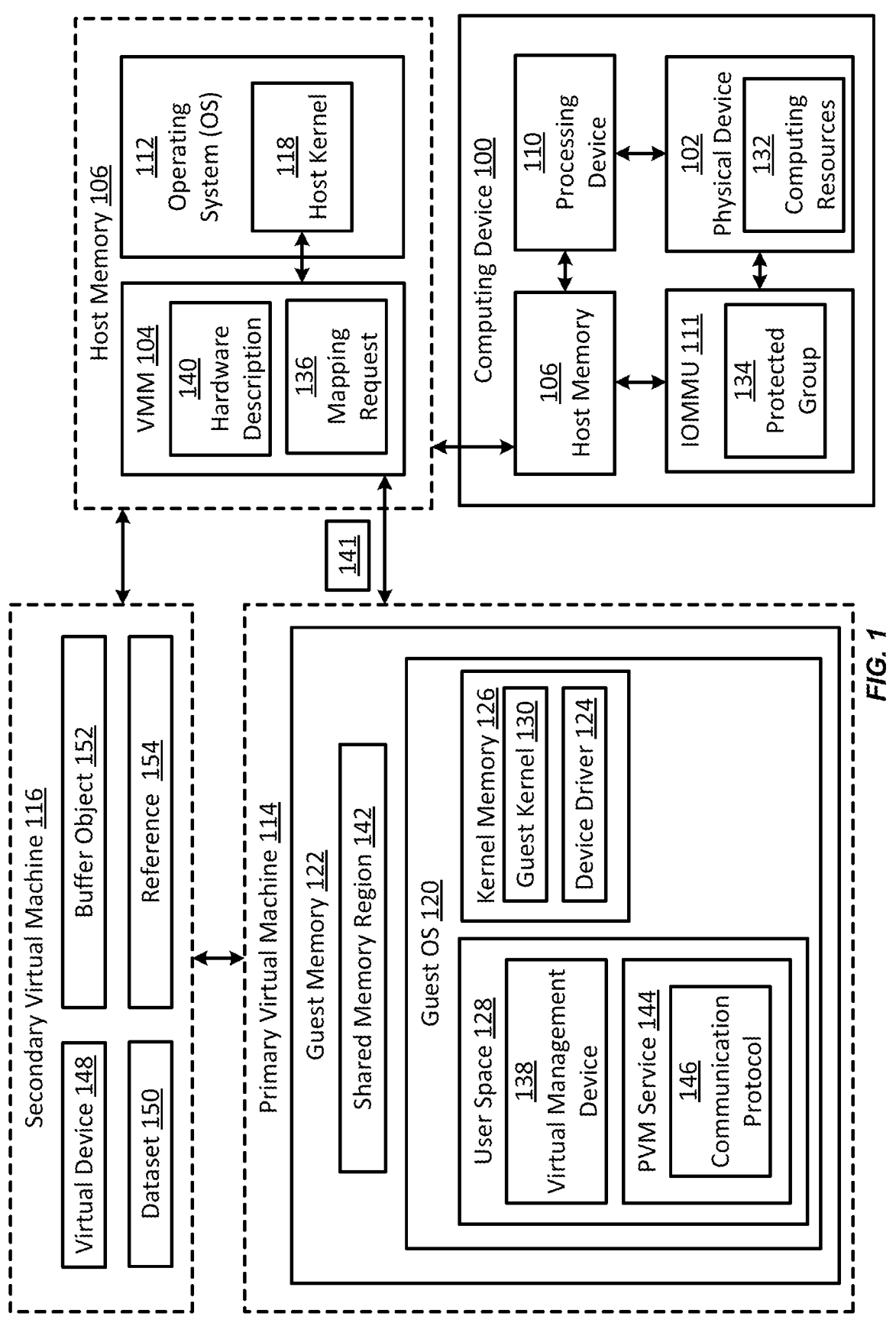
FIG. 1 is a block diagram of an example of a computing environment for sharing access to a physical device with multiple virtual machines according to some aspects of the present disclosure.

A physical computer system can include physical hardware running a virtual machine manager (VMM) to manage one or more virtual machines. The virtual machine can include virtualized hardware that emulates the physical hardware, such as a virtual central processing unit (vCPU) or a virtual graphics accelerator. A host kernel of the physical computer system can run one or more device drivers to provide a software interface to physical devices (e.g., peripherals and graphics cards) of the physical computer system, enabling an operating system of the physical computer system to access hardware functions. In some cases, the device drivers can be created by external entities. Code for such device drivers may lack rigorous testing that would minimize vulnerabilities (e.g., bugs, exploits, unpatched program code, etc.) in the code. For instance, device drivers are a major cause of kernel crashes and stalls. If a device driver can access critical infrastructure for the kernel, the vulnerabilities associated with this device driver may stall or fail the entire physical computer system.

Some examples of the present disclosure can overcome one or more of the issues mentioned above by delegating control of a physical device to a virtual machine, which in turn can perform a process to share access to the physical device with additional virtual machines executing on a computing device. In particular, the virtual machine can be a primary virtual machine (PVM) that can take ownership of the physical device, such that a host kernel of a computer system can avoid loading device drivers that may cause vulnerabilities. By delegating the control of the physical device to the PVM, the PVM's guest operating system (e.g., guest kernel) can serve as a replacement for the host operating system with respect to accessing and controlling the physical device. This can minimize the impact of driver problems on the host kernel and the cascading effects on the computing device, isolating their impact to the virtual machine. In some examples, the host kernel can isolate computing resources associated with the physical device by creating a protected group in a memory system of the computer system. As a result, the host kernel can avoid executing low-level drivers or other software to support the physical device, thereby minimizing vulnerabilities in the computer system.

Once the PVM takes ownership of the physical device, the PVM can implement a device sharing process to share access to the physical device with at least one additional virtual machine that can be referred to as a secondary virtual machine (SVM). The device sharing process can involve coordination between the VMM and the PVM to reserve a shared memory region in a guest memory of the PVM. The VMM can support both the PVM and the SVM, thereby facilitating the device sharing process. The shared memory region can provide a device protocol associated with the physical device. Through the shared memory region, the SVM can initialize the device protocol as a virtual device associated with the physical device, thereby obtaining access the physical device. This sharing process can allow the computer system to maintain flexibilities afforded by virtual machines. For example, due to shared access of the physical device, the PVM and the SVM can run different operating systems while accessing the same physical device.

In one particular example, firmware of a computing system can perform a device initialization process to initialize a physical device that can be delegated to a PVM of the computing system. The physical device may be a peripheral or accessory device attached to the computing system. A virtual machine monitor (VMM) of the computing system can request device information from a host kernel of the computing system. Using the device information, the VMM can generate a hardware description that describes the physical device, along with other physical devices to be virtualized in the PVM. Once the VMM generates the hardware description, the VMM can initialize the PVM to delegate control of the physical device to the PVM. The PVM can use the hardware description generated by the VMM to initialize the physical device and one or more device drivers associated with the physical device. Additionally, the PVM can initialize a kernel subsystem to enable a user space of the PVM to access the physical device.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing device 100 for sharing access to a physical device 102 with multiple virtual machines according to some aspects of the present disclosure. Examples of the computing device 100 can include a desktop computer, laptop computer, server, mobile phone, or tablet. The computing device 100 can include a virtual machine monitor (VMM) 104 in host memory 106 of the computing device 100. The computing device 100 can include a processing device 110, such as a central processing unit, communicatively coupled with the host memory 106 to perform operations based on instruction in the host memory 106. Additionally, the computing device 100 can include the physical device 102 and an input-output memory management unit (IOMMU) 111 that can couple the physical device 102 to the host memory 106. The physical device 102 can be peripheral or accessory hardware, for example associated with a system-on-chip (SoC). Examples of the physical device 102 can include graphics processing units (GPUs), codecs, image signal processors (ISPs), camera sensors, digital signal processors (DSPs), etc. The IOMMU 111 can map virtual addresses used by the virtual machines to physical addresses of the host memory 106, facilitating virtualization associated with the virtual machines.

The computing device 100 can execute the VMM 104 and a host operating system (OS) 112 to initiate a set of virtual machines that can include a primary virtual machine (PVM) 114 and a secondary virtual machine (SVM) 116. Although one SVM 116 is depicted in FIG. 1, it will be appreciated that more than one SVM may be initiated in the computing device 100. The host OS 112 can include a host kernel 118 that can facilitate interactions between hardware and software of the computing device 100. In some examples, the host OS 112 can execute the VMM 104. For example, if the host OS 112 includes a virtualization module (e.g., Kernel-based Virtual Machine (KVM)) in the host kernel 118 of the host OS 112, the host kernel 118 can function as the VMM 104. In other examples, the computing device 100 can execute the VMM 104 separately from, or exclusive of, the host OS 112.

The VMM 104 can virtualize a physical layer (e.g., the physical device 102) of the computing device 100 and present this virtualization to the set of virtual machines as virtual devices. Examples of the physical layer can include processors, memory devices, input/output (I/O) devices, and the like that can be virtualized by the VMM 104 as virtual processors, virtual memory devices, and virtual I/O devices, respectively, etc. The set of virtual machines may run any type of dependent, independent, or compatible applications on the underlying hardware and host OS 112. For example, the PVM 114 can execute a guest OS 120 that resides in guest memory 122 of the PVM 114 that can use underlying hardware to run software, such as a device driver 124 associated with the physical device 102. Examples of the underlying hardware can include a guest central processing unit (CPU) or a guest input-output memory management unit (IOMMU). The guest OS 120 can segregate virtual memory allocated to the PVM 114 into kernel memory 126 and user space 128. The kernel memory 126 can store data structures related to a guest kernel 130 responsible for performing operations of the guest OS 120. The user space 128 can include code running outside of the guest kernel 130.

The device driver 124 running using the guest memory 122 can include one or more files that can enable the hardware (e.g., the physical device 102) to communicate with the host OS 112 of the computing device 100. In some cases, the device driver 124 may be associated with external entities, such that the device driver 124 may be untrusted by the computing device 100 due to a relatively high likelihood of containing vulnerabilities. To mitigate a security risk associated with using the device driver 124, the VMM 104 can delegate control of the physical device 102 from the host kernel 118 to the PVM 114. By taking over control of the physical device 102, the PVM 114 can assume responsibility of the physical device 102 and corresponding software, such as the device driver 124 or a kernel subsystem. As a result, the host system (e.g., the host kernel 118) of the computing device 100 can avoid integrating the corresponding software of the physical device 102 that may expose the computing device 100 to vulnerabilities. Additionally, once the PVM 114 assumes control of the physical device 102, the PVM 114 can enable the SVM 116 to access the physical device 102. Thus, delegating control of the physical device 102 to the PVM 114 can prevent vulnerabilities to improve device security while enabling shared access to the physical device 102 for multiple virtual machines.

The host kernel 118 can isolate computing resources 132 (e.g., RAM, virtual memory, etc.) associated with the physical device 102, which may prevent unauthorized access to the physical device 102. For example, the host kernel 118 (e.g., using a Virtual Function I/O (VFIO) framework) can create a protected group 134 for the physical device 102 in the IOMMU 111 of the computing device 100. The protected group 134 can prevent unauthorized access of the computing resources 132, thereby improving security of the computing device 100. Creating the protected group 134 in the IOMMU 111 can involve linking the physical device 102 to a virtual address of host memory 106 that is unassociated with other physical devices attached to the computing device 100. Accordingly, the IOMMU 111 can distinguish the physical device 102 in the protected group 134 based on the virtual address allocated to the physical device 102.

In some examples, the VMM 104 can transmit a mapping request 136 to the host kernel 118 to map the computing resources 132 of the physical device 102 into the guest memory 122 of the PVM 114. Once the host kernel 118 receives the mapping request 136, the host kernel 118 can map the virtual address associated with the physical device 102 in the IOMMU 111 to the guest memory 122 of the PVM 114. For example, a guest IOMMU of the PVM 114 can store a guest memory address of the physical device 102 in a guest page table of the guest IOMMU. The guest memory address can correspond to the virtual address of the physical device 102. Thus, the host kernel 118 can enable the PVM 114 to access the computing resources 132, for example once the PVM 114 acquires control of the physical device 102.

In some examples, the VMM 104 can request from the host kernel 118 a list of PVM devices including the physical device 102 to expose to the PVM 114. In some examples, in addition to the physical device 102, the VMM 104 may configure a virtual management device 138 to expose to the PVM 114 as part of the PVM devices. For example, if the hardware of the computing device 100 includes one or more sensors, the VMM 104 can configure a virtual I/O system control and management interface (VirtIO SCMI) device to access the sensors through corresponding sensor drivers. Based on the PVM devices to be exposed to the PVM 114, the VMM 104 can generate a hardware description 140 (e.g., a device tree) that can describe the PVM devices associated with the PVM 114. In some instances, the hardware description 140 can describe a topology of the PVM devices associated with the PVM 114.

After the VMM 104 generates the hardware description 140, the VMM 104 can initiate a startup of the PVM 114. In some examples, the VMM 104 may use KVM interfaces provided by the host kernel 118 to initiate the startup of the PVM 114. Using the hardware description 140, the PVM 114 can initialize the PVM devices and corresponding device drivers of the PVM devices. In some cases, the VMM 104 can generate a device tree as the hardware description 140. The guest kernel 130 of the PVM 114 can read the hardware description 140 to identify and manage the physical device 102, for example using the device driver 124 as an interface between the physical device 102 and the PVM 114. Additionally, the PVM 114 can use a kernel subsystem and one or more drivers associated with the kernel subsystem to enable the user space 128 of the PVM 114 to access the physical device 102. For example, if the kernel subsystem is a Direct Rendering Manager (DRM), the kernel subsystem can expose an application programming interface (API) that the user space 128 of the PVM 114 can use to control the physical device 102 (e.g., a graphics processing unit (GPU)). In some cases, the user space 128 may use the API exposed by the DRM to transmit commands, data, or a combination of these to the physical device 102.

To use the physical device 102 to perform an operation, the PVM 114 can use the device driver 124 to generate an operation request that can be stored in a buffer in a virtual queue of buffers associated with the PVM 114. Using the buffer, the physical device 102 can execute the operation of the operation request. Once the physical device 102 executes the operation, the physical device 102 can mark the buffer as used or completed to create a used buffer that can be returned to the queue to indicate to the PVM 114 that the operation has been executed. A virtqueue can be an example of the queue of buffers. In particular, the virtqueue can be a ring buffer associated with the PVM 114 that can provide a virtual buffer queue to enable communication between the VMM 104 and the guest OS 120.

After control of the physical device 102 is transferred from the host kernel 118 to the PVM 114, the PVM 114 can perform a device sharing process to share access to the physical device 102 with the SVM 116. To initiate the device sharing process, the VMM 104 can transmit an access request 141 to the PVM 114 to initiate the device sharing process. Based on the request, the PVM 114 can coordinate with the VMM 104 to allocate a shared memory region 142 of the guest memory 122 to share with the SVM 116. In some examples, the shared memory region 142 can facilitate data transfer by storing the queue of buffers associated with the PVM 114 so that the host system (e.g., the host kernel 118 or the VMM 104) can interact with the shared memory region 142 by reading or writing to the buffers.

After the VMM 104 and the PVM 114 reserve the shared memory region 142 to share with the SVM 116, the PVM 114 can map the shared memory region 142 to the user space 128 of the guest OS 120 associated with the PVM 114. The user space 128 can expose a PVM service 144, which the SVM 116 can use to access the physical device 102, thereby enabling the PVM 114 to share access to the physical device 102 with the SVM 116. In particular, the PVM service 144 can provide a communication protocol 146 (e.g., vhost-user-gpu) specific to the physical device 102. The SVM 116 can use the PVM service 144 to create a virtual device 148 as a virtualization of the physical device 102. Through the virtual device 148, the SVM 116 can access the physical device 102. In some examples, the communication protocol 146 can be used to implement a synchronization mechanism (e.g., a GPU fence) between the virtual device 148 and a corresponding device driver for the virtual device 148.

As an example, if the physical device 102 is a GPU, the SVM 116 can initialize the PVM service 144 as a virtual GPU (vGPU) that can provide functions similar to the GPU. The SVM 116 can then request certain functionality of the vGPU, which can communicate the request to the PVM service 144 using the communication protocol. In turn, the PVM service can communicate the request to the physical GPU. In this way, the SVM 116 can access the physical GPU via the PVM 114, by using the communication protocol of the PVM service 144. Similar to the PVM 114 accessing the physical device 102, the SVM 116 can use the kernel subsystem and the drivers associated with the kernel subsystem to enable a different user space associated with the SVM 116 to access the physical device 102.

In addition to enabling the SVM 116 to access the physical device 102, the virtual device 148 can facilitate data transfer between the SVM 116 and the PVM 114. For example, the SVM 116 can transmit a dataset 150 between the SVM 116 and the PVM 114 without using multiple data copies, thereby conserving storage resources associated with the computing device 100. To share the dataset 150 with the PVM 114, the SVM 116 can use the virtual device 148 to create a buffer object 152 associated with the dataset 150, for example to locate the dataset 150. The virtual device 148 then can use the communication protocol 146 provided by the PVM service 144 to transmit a reference 154 to the buffer object 152 to the user space 128 of the PVM 114.

Once the user space 128 receives the reference 154 to the buffer object 152, the user space 128 can interpret the reference 154 to recreate the dataset 150 in context of the SVM 116. In some examples, the user space 128 may coordinate with the VMM 104 to interpret the reference 154 to the buffer object 152. By recreating the dataset 150, the user space 128 can map the dataset 150 into suitable memory regions accessible by the PVM 114 such that the dataset 150 can be shared by the SVM 116 with the PVM 114. For example, the user space 128 may generate a mapping associated with the dataset 150 using the suitable memory regions such that the PVM 114 can use the mapping to locate the dataset 150. Thus, mapping the dataset 150 into the suitable memory regions can enable the PVM 114 to use or access the dataset 150 without creating a copy of the dataset 150, thereby conserving storage resources of the computing device 100.

While FIG. 1 depicts a specific arrangement of components, other examples can include more components, fewer components, different components, or a different arrangement of the components shown in FIG. 1. For instance, in other examples, the computing device 100 may include more than two virtual machines. For example, the computing device 100 can include the PVM 114 and more than one SVM 116, some or all of which may share access to the physical device 102.

Figure 2:
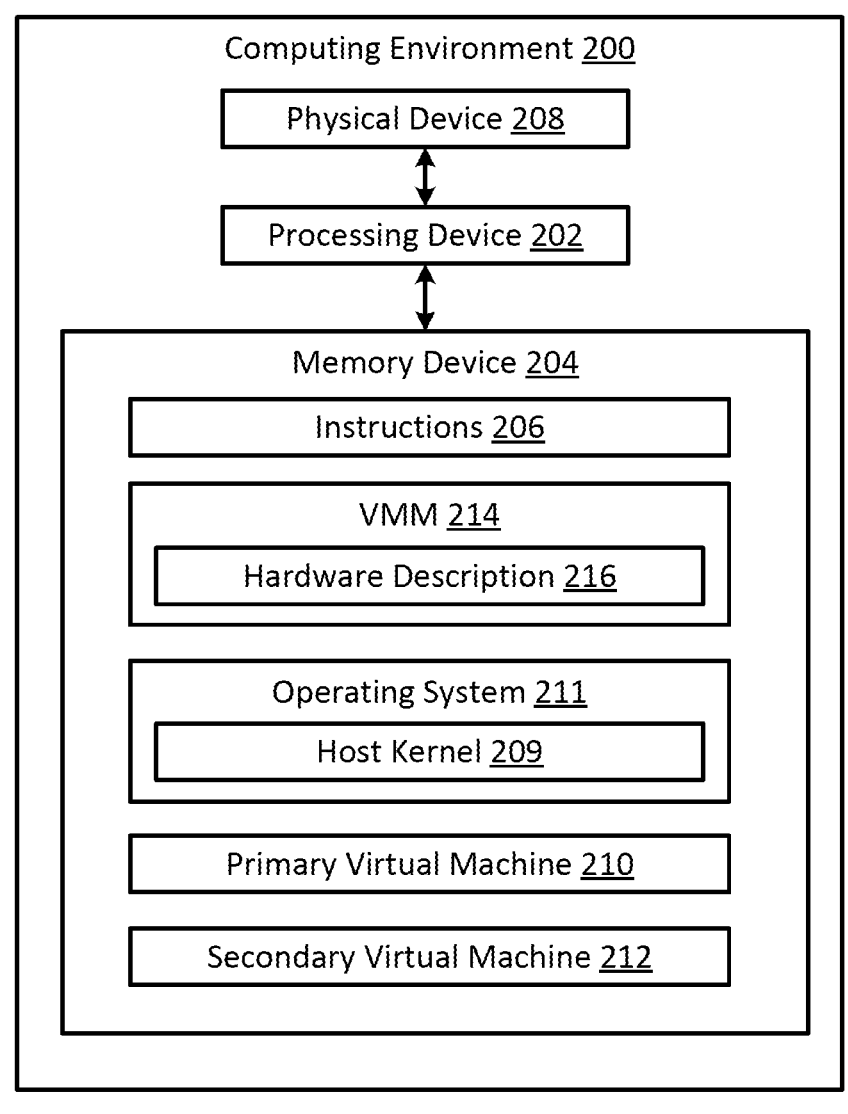
FIG. 2 is a block diagram of another example of a computing environment for sharing access to a physical device with multiple virtual machines according to some aspects of the present disclosure.

FIG. 2 is a block diagram of another example of a computing environment 200 for sharing access to a physical device 208 with multiple virtual machines according to some aspects of the present disclosure. The computing environment 200 can include a processing device 202 communicatively coupled to a memory device 204. In some examples, the processing device 202 can be the processing device 110 of FIG. 1. Similarly, the memory device 204 can be the host memory 106 of FIG. 1.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processing device 202 can delegate control of the physical device 208 from a host kernel 209 for an operating system 211 of the processing device 202 to a primary virtual machine (PVM) 210. The PVM 210 can then share access to the physical device 208 with a secondary virtual machine (SVM) 212. For example, the processing device 202 may transfer control of the physical device 208 from the host kernel 209 to the PVM 210 to protect critical memory regions of the memory device 204. By having the PVM 210 assume responsibilities associated with the physical device 208, the processing device 202 can avoid using the host kernel 209 to run unsecure device drivers or kernel subsystems associated with the physical device 208. A virtual machine monitor (VMM) 214 can generate a hardware description 216 that can describe the physical device 208. The hardware description 216 may also describe other physical devices to be virtualized in the PVM 210. The hardware description 216 can be used by the PVM 210 to acquire control of the physical device 208 from the host kernel 209. For example, the hardware description 216 may be a device tree that can describe a topology of hardware resources including the physical device 208 that can be delegated to the PVM 210.

Additionally, the VMM 214 can initiate or create the PVM 210 and one or more additional virtual machines, such as the SVM 212. For example, the VMM 214 can load a respective virtual machine image to create the PVM 210 and the SVM 212. Once the PVM 210 is running, the VMM 214 can delegate control of the physical device 208 from the host kernel 209 to the PVM 210. After control of the physical device 208 is delegated to the PVM 210, a device sharing process can be performed by the PVM 210 to share access to the physical device 2108 with the SVM 212. The VMM 214 can service both the PVM 210 and the SVM 212 such that the processing device 202 can use the VMM 214 to facilitate the device sharing process.

FIGS. 3-6 show various examples of processes for delegating and sharing control of a physical device 102 according to some aspects of the present disclosure. Other examples can involve more steps, fewer steps, different steps, or a different order of the steps depicted in FIGS. 3-6. The steps of FIGS. 3-6 are described below with reference to components discussed above in FIGS. 1-2. In some examples, the processing device 202 can perform one or more of the steps shown in FIGS. 3-6.

FIG. 3 is a flowchart of a process 300 for sharing access to a physical device 102 with multiple virtual machines according to some aspects of the present disclosure. The physical device 102 can be a hardware device that is part of a system-on-chip (SoC) of a computer system. The computer system may include more than one virtual machine that may each require access to the physical device 102. Delegating control of the physical device 102 to a primary virtual machine (PVM) 114 of the virtual machines can enable other virtual machines in the computer system to access the physical device 102 via the PVM 114.

In block 302, the processing device 202 generates, by a virtual machine monitor (VMM) 104, a hardware description 140 to describe the physical device 102. For example, the processing device 202 may create a data structure or a file (e.g., a Device Tree Blob (DTB) file) as the hardware description 140 to describe hardware including the physical device 102 that can be allocated to the PVM 114. The physical device 102 can be accessible by a secondary virtual machine (SVM) 116 via the PVM 114 after control of the physical device 102 is delegated to the PVM 114.

In block 304, the processing device 202 initiates, by the VMM 104, the PVM 114 that can use the hardware description 140 to acquire control of the physical device 102 from a host kernel 118. For example, the processing device 202 can use the VMM 104 to load a virtual machine image to initiate the PVM 114. After the processing device 202 initiates the PVM 114, the processing device 202 can use the VMM 104 to allocate suitable resources (e.g., control of the physical device 102) to the PVM 114.

In block 306, the processing device 202 delegates, by the VMM 104, control of the physical device 102 to the PVM 114. The delegation process to assign control of the physical device 102 to the PVM 114 is further described below with respect to process 400 of FIG. 4. A device sharing process can then be performed by the PVM 114 to share access to the physical device 102 with the SVM 116. The device sharing process is further described below with respect to process 500 of FIG. 5.

FIG. 4 is a flowchart of a process 400 for delegating control of a physical device 102 to a primary virtual machine (PVM) 114 according to some aspects of the present disclosure. By delegating control of the physical device 102 to the PVM 114, the processing device 202 can avoid compromising a host kernel 118 of the computing device 100 while maintaining flexibility provided by virtual machines in the computing device 100.

In block 402, a virtual machine monitor (VMM) 104 transmits a mapping request 136 to the host kernel 118 to map computing resources 132 of the physical device 102 into a guest memory 122 of the PVM 114. In some examples, the host kernel 118 can isolate the computing resources 132 of the physical device 102 in a protected group 134 of an input-output memory management unit (IOMMU) 111. Once the host kernel 118 receives the mapping request 136, the host kernel 118 can map a virtual address associated with the physical device 102 in the IOMMU 111 to the guest memory 122 of the PVM 114. By mapping the computing resources 132 of the physical device 102 to the guest memory 122, the host kernel 118 can enable the PVM 114 to access the computing resources 132, for example after assuming control of the physical device 102.

In block 404, the VMM 104 configures a virtual management device 138 to expose to the PVM 114. For example, the processing device 202 may use the VMM 104 to configure a virtual I/O system control and management interface (VirtIO SCMI) device as the virtual management device 138. In some cases, the VMM 104 can transfer control of the virtual management device 138 to the PVM 114 to enable the PVM 114 to manage additional physical devices (e.g., sensors).

In block 406, the VMM 104 generates a hardware description 140 that describes a set of PVM devices, where the set of PVM devices can include the physical device 102 and the virtual management device 138. For example, the hardware description 140 can provide hardware configuration related to the set of PVM devices, such as peripheral device connections, size of RAM, interrupt controllers, etc. The hardware description 140 can be used by the PVM 114 to identify the set of PVM devices that the PVM 114 can assume control of from the processing device 202. In some cases, the hardware description 140 may provide device information for non-discoverable physical devices that may be difficult to detect or discover using a client program.

In block 408, the VMM 104 initializes the PVM 114, which in turn uses the hardware description 140 to initialize the set of PVM devices and one or more device drivers associated with the set of PVM devices. In some examples, the PVM 114 can set up the set of PVM devices using the hardware description 140 and the device drivers associated with the set of PVM devices. For example, the PVM 114 can use the hardware description 140 to determine that a device driver 124 is associated with the physical device 102, such that the device driver 124 can be used to manage the physical device 102.

FIG. 5 is a flowchart of a process 500 for sharing access to a physical device 102 with a secondary virtual machine (SVM) 116 via a primary virtual machine (PVM) 114 according to some aspects of the present disclosure. After the PVM 114 assumes control of the physical device 102 (e.g., from a host kernel 118), the PVM 114 can share access to the physical device 102 with the SVM 116. In some examples, with shared access to the physical device 102, the PVM 114 and the SVM 116 can use the same physical device 102 while running different operating systems due to virtual machine isolation.

In block 502, the VMM 104 transmits, to the PVM 114, an access request 141 for the SVM 116 to access the physical device 102. The access request 141 can be used to initiate a device sharing process, which the PVM 114 can perform to share access to the physical device 102 with the SVM 116. In some examples, an interface coupling the VMM 104 to the PVM 114 can be used to transmit the access request 141 from the VMM 104 to the PVM 114.

In block 504, the VMM 104 allocates a shared memory region 142 of a guest memory 122 of the PVM 114 for this sharing purpose. The shared memory region 142 can be used to enable the SVM 116 to access the physical device 102. In some cases, the PVM 114 can coordinate with the VMM 104 to reserve the shared memory region 142 to implement the device sharing process. For example, the PVM 114 and the VMM 104 can work together to create a mapping of the shared memory region 142. The mapping of the shared memory region 142 can be shared with the SVM 116 to enable the SVM 116 to locate the shared memory region 142 in the guest memory 122. In some examples, a hardware interrupt may be used by the processing device 202 to indicate to the PVM 114 and the SVM 116 when the shared memory region 142 is updated.

In block 506, the PVM 114 maps its user space 128 to the shared memory region 142. Mapping the user space 128 to the shared memory region 142 can allow the PVM 114 to share access to physical device 102 with the SVM 116 via the user space 128. In some examples, the processing device 202 can use the user space 128 of the PVM 114 to host a PVM service 144, which can provide a communication protocol 146 associated with the physical device 102. For example, if the PVM service 144 is associated with vhost-user architecture, the PVM service 144 can be part of a module with one or more application programming interfaces (APIs) associated with a data plane framework. An example of the data plane framework can include Data Plane Development Kit (DPDK).

In block 508, the PVM 114 exposes the PVM service 144 to the SVM 116, so that the SVM 116 can access the physical device 102. To facilitate this access, the SVM 116 may initiate a virtual device 148 that serves as a virtual representation of the physical device 102 and is coupled to the PVM service 144. More specifically, the PVM service 144 can be initialized by the SVM 116 as the virtual device 148, which can function as a virtualization of the physical device 102. Accordingly, the virtual device 148 can be used to fulfill the device sharing process performed by the processing device 202 using the PVM 114 to share access to the physical device 102 with the SVM 116. In some examples, if additional virtual machines are available in a computer system managed by the processing device 202, the PVM 114 can perform a similar device sharing process for the additional virtual machines.

FIG. 6 is a flowchart of a process 600 for sharing a dataset 150 between a primary virtual machine (PVM) 114 and a secondary virtual machine (SVM) 116 according to some aspects of the present disclosure. In some examples, the dataset 150 can be a data blob that can function as a binary large object that provides a collection of binary data stored as a single object. For example, the dataset 150 may include images, audio, binary executable code, etc. By sharing access to the physical device 102 through the PVM 114 to the SVM 116, the data transfer can be enabled between the PVM 114 and the SVM 116. For example, a communication protocol 146 associated with the physical device 102 that is provided by the PVM 114 can facilitate the data transfer.

In block 602, the SVM 116 initializes a virtual device 148 to access the physical device 102. As described above with respect to process 500 of FIG. 5, the SVM 116 can use a PVM service 44 with a communication protocol 146 associated with the physical device 102 to create a virtualization of the physical device 102. The virtual device 148 can function as the virtualization of the physical device 102 and can be used by the SVM 116 to access the physical device 102.

In block 604, the virtual device 148 creates a buffer object 152 (e.g., a dmabuf object) associated with the dataset 150 shared by the SVM 116. In some examples, the processing device 202 may emulate the virtual device 148 using a virtual machine monitor (VMM) 104 that can service the SVM 116. The buffer object 152 can be used by the PVM 114 to identify the dataset 150 shared by the SVM 116.

In block 606, the virtual device 148 transmits a reference 154 to the buffer object 152 to the PVM 114. In some examples, the processing device 202 can transmit the reference 154 using an extension of the communication protocol 146 associated with the physical device 102. The reference 154 to the buffer object 152 can be used by a user space 128 of the PVM 114 to map the dataset 150 to a guest memory 122 of the PVM 114. Based on the reference 154, the processing device 202 can use the user space 128 of the PVM 114 in coordination with the VMM 104 to recreate the dataset 150, thereby mapping the dataset 150 to the guest memory 122. Once the dataset 150 is mapped to the guest memory 122, the dataset 150 can be accessible by the PVM 114 such that the SVM 116 has successfully shared the dataset 150 with the PVM 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer system comprising:
a physical device;
a processing device communicatively coupled to the physical device, the physical device being separate from the processing device; and
a memory device including instructions that are executable by the processing device for causing the processing device to perform operations for allowing a secondaryvirtual machine (SVM) to access the physical device via a primary virtual machine (PVM), the operations comprising:
generating, by a virtual machine monitor (VMM), a hardware description configured to describe the physical device;
initiating, by the VMM, the PVM, the PVM configured to use the hardware description to acquire control of the physical device from a host kernel;

delegating, by the VMM, control of the physical device from the host kernel to the PVM, wherein after control of the physical device is delegated to the PVM, the PVM is configured to perform a device sharing process to share access to the physical device with the SVM;
transmitting, by the VMM to the PVM, an access request for the SVM to access the physical device, wherein the VMM is configured to support the PVM and the SVM; and
subsequent to transmitting the access request to the PVM, allocating, by the VMM, a shared memory region of a guest memory of the PVM usable to perform the device sharing process to enable the SVM to access the physical device, wherein the shared memory region of the guest memory is configured to map to a user space of the PVM, wherein the user space of the PVM is configured to expose a PVM service that is usable by the SVM to access the physical device, and wherein the SVM is configured to initialize the PVM service as a virtual device associated with the physical device, the virtual device being configured to enable the SVM to access the physical device.

2. The computer system of claim 1, wherein the operations further comprise, prior to initiating the PVM:
transmitting, bythe VMM, a mapping request to the host kernel to map computing resources of the physical device into the guest memory of the PVM, wherein the host kernel is configured to isolate computing resources of the physical device by creating a protected group in an input-output memory management unit (IOMMU) of the computer system, and wherein the protected group prevents unauthorized access of the computing resources.

3. The computer system of claim 1, wherein the PVM is further configured to acquire control of the physical device by initializing a kernel subsystem and one or more device drivers associated with the physical device to enable the user space of the PVM to access the physical device.

4. The computer system of claim 1, wherein the operations further comprise, prior to generating the hardware description:
configuring, by the VMM based on the physical device, a virtual management device to expose to the PVM; and
generating the hardware description that describes a plurality of PVM devices, wherein the plurality of PVM devices comprises the physical device and the virtual management device.

5. The computer system of claim 1, wherein the SVM is configured to share a dataset with the PVM by:
initializing the virtual device usable to access the physical device;
creating, by the virtual device, a buffer object associated with the dataset, wherein the buffer object is usable to locate the dataset; and
transmitting, by the virtual device, a reference to the buffer object to the PVM, wherein the user space of the PVM is configured to use the reference to the buffer object to map the dataset to the guest memory of the PVM.

6. A method comprising:
generating, by a virtual machine monitor (VMM) executing on a processing device of a computer system, a hardware description that describes a physical device of the computer system, the physical device being separate from the processing device;

initiating, by the VMM, a primary virtual machine (PVM) that is configured to use the hardware description to acquire control of the physical device from a host kernel;

delegating, by the VMM, control of the physical device from the host kernel to the PVM, wherein after control of the physical device is delegated to the PVM, the PVM is configured to perform a device sharing process to share access to the physical device with a secondary virtual machine (SVM);

transmitting, by the VMM to the PVM, an access request for the SVM to access the physical device, wherein the VMM is configured to support the PVM and the SVM; and subsequent to transmitting the access request to the PVM, allocating, by the VMM, a shared memory region of a guest memory of the PVM usable to perform the device sharing process to enable the SVM to access the physical device, wherein the shared memory region of the guest memory is mapped to a user space of the PVM, wherein the user space of the PVM exposes a PVM service that is usable by the SVM to access the physical device, and wherein the SVM initializes the PVM service as a virtual device associated with the physical device, the virtual device enabling the SVM to access the physical device.

7. The method of claim 6, further comprising, prior to initiating the PVM:

transmitting, by the VMM, a mapping request to the host kernel to map computing resources of the physical device into the guest memory of the PVM, wherein the host kernel is configured to isolate computing resources of the physical device by creating a protected group in an input-output memory management unit (IOMMU), and wherein the protected group prevents unauthorized access of the computing resources.

8. The method of claim 6, wherein the PVM is further configured to obtain control of the physical device by initializing a kernel subsystem and one or more device drivers associated with the physical device to enable the user space of the PVM to access the physical device.

9. The method of claim 6, further comprising, prior to generating the hardware description:

configuring, by the VMM based on the physical device, a virtual management device to expose to the PVM; and generating the hardware description that describes a plurality of PVM devices, wherein the plurality of PVM devices comprises the physical device and the virtual management device.

10. The method of claim 6, wherein the SVM is configured to share a dataset with the PVM by:

initializing the virtual device usable to access the physical device;

creating, by the virtual device, a buffer object associated with the dataset, wherein the buffer object is usable to locate the dataset; and transmitting, by the virtual device, a reference to the buffer object to the PVM, wherein the user space of the PVM is configured to use the reference to the buffer object to map the dataset to the guest memory of the PVM.

11. A non-transitory computer-readable medium comprising program code executable by a processing device for causing the processing device to perform operations comprising:

generating, by a virtual machine monitor (VMM), a hardware description that describes a physical device;

initiating, by the VMM, a primary virtual machine (PVM) that is configured to use the hardware description to acquire control of the physical device from a host kernel;

delegating, by the VMM, control of the physical device from the host kernel to the PVM, wherein after control of the physical device is delegated to the PVM, the PVM is configured to perform a device sharing process to share access to the physical device with a secondary virtual machine (SVM);

transmitting, by the VMM to the PVM, an access request for the SVM to access the physical device, wherein the VMM is configured to support the PVM and the SVM; and subsequent to transmitting the access request to the PVM, allocating, by the VMM, a shared memory region of a guest memory of the PVM usable to perform the device sharing process to enable the SVM to access the physical device, wherein the shared memory region of the guest memory is configured to map to a user space of the PVM, wherein the user space of the PVM is configured to expose a PVM service that is usable by the SVM to access the physical device, and wherein the SVM is configured to initialize the PVM service as a virtual device associated with the physical device, the virtual device being configured to enable the SVM to access the physical device.

12. The non-transitory computer-readable medium of claim 11, wherein the operations further comprise, prior to initiating the PVM:

transmitting, by the VMM, a mapping request to the host kernel to map computing resources of the physical device into the guest memory of the PVM, wherein the host kernel is configured to isolate computing resources of the physical device by creating a protected group in an input-output memory management unit (IOMMU), and wherein the protected group prevents unauthorized access of the computing resources.

13. The non-transitory computer-readable medium of claim 11, wherein the PVM is further configured to obtain control of the physical device by initializing a kernel subsystem and one or more device drivers associated with the physical device to enable the user space of the PVM to access the physical device.

14. The non-transitory computer-readable medium of claim 11, wherein the operations further comprise, prior to generating the hardware description:

configuring, by the VMM based on the physical device, a virtual management device to expose to the PVM; and generating the hardware description that describes a plurality of PVM devices, wherein the plurality of PVM devices comprises the physical device and the virtual management device.

15. The non-transitory computer-readable medium of claim 11, wherein the SVM is configured to share a dataset with the PVM by:

initializing the virtual device usable to access the physical device;

creating, by the virtual device, a buffer object associated with the dataset, wherein the buffer object is usable to locate the dataset; and transmitting, by the virtual device, a reference to the buffer object to the PVM, wherein the user space of the PVM is configured to use the reference to the buffer object to map the dataset to the guest memory of the PVM.

* * * * *